United States Patent
Raghuveer et al.

(10) Patent No.: US 10,204,128 B2
(45) Date of Patent: Feb. 12, 2019

(54) AUTOMATIC DETECTION OF EXPIRATION TIME OF EVENT-BASED ARTICLES

(71) Applicant: Yahoo! Inc., Sunnyvale, CA (US)

(72) Inventors: Aravindan Raghuveer, Bangalore (IN); Syama Prasad Suprasadachandranpillai, Manjeri (IN); Tom Praison Rajadurai A, Bangalore (IN); Amit Kumar, New Delhi (IN); Rahul Singh, Bangalore (IN); Gaurav Sindhwani, Chandigarh (IN); Souri Nath Datta, Kolkata (IN); Hemant Minocha, Bangalore (IN); Satish Mummareddy, Sunnyvale, CA (US)

(73) Assignee: Oath Inc., New York, NY (US)

( * ) Notice: Subject to any disclaimer, the term of this patent is extended or adjusted under 35 U.S.C. 154(b) by 948 days.

(21) Appl. No.: 14/096,944

(22) Filed: Dec. 4, 2013

(65) Prior Publication Data
US 2015/0154242 A1    Jun. 4, 2015

(51) Int. Cl.
*G06F 17/30* (2006.01)
(52) U.S. Cl.
CPC .............. *G06F 17/30368* (2013.01)
(58) Field of Classification Search
CPC .................................. G06F 17/30368
See application file for complete search history.

(56) References Cited

U.S. PATENT DOCUMENTS

| | | | | |
|---|---|---|---|---|
| 2008/0059365 A1* | 3/2008 | Lee | .............. | G06Q 10/10 705/38 |
| 2008/0183691 A1* | 7/2008 | Kwok | .............. | G06F 17/30616 |
| 2008/0306784 A1* | 12/2008 | Rajkumar | .............. | G06F 17/21 705/342 |
| 2010/0268767 A1* | 10/2010 | McColgan | .............. | H04L 67/24 709/203 |
| 2011/0161168 A1* | 6/2011 | Dubnicki | .............. | G06F 17/30707 705/14.49 |
| 2012/0324331 A1* | 12/2012 | Chartier | .............. | G06F 17/30896 715/234 |
| 2014/0114965 A1* | 4/2014 | Balduzzi | .............. | G06F 17/30867 707/723 |
| 2014/0372433 A1* | 12/2014 | Dougherty | .............. | G06F 17/30014 707/736 |

* cited by examiner

*Primary Examiner* — Huawen A Peng
(74) *Attorney, Agent, or Firm* — Martine Penilla Group, LLP (57) ABSTRACT

Methods and systems for detecting expiration time of an article include receiving the article for a pre-planned event. The article is analyzed to identify one or more attributes. The article is matched to an event identifier using the article attributes. The event identifier is pre-defined and stored in an event database. The event identifier acts as an index to the event database for obtaining event characteristics of the pre-planned event. The article attributes are examined to identify event phase indicators that correlate to a specific event phase of the pre-planned event. The expiration time of the article is computed based on the specific event phase identified for the pre-planned event. The expiration time is used to rank the article and for considering assigning the article to a content pool of articles that is selected for publishing for the specific event phase of the pre-planned event.

22 Claims, 7 Drawing Sheets

AUTOMATIC DETECTION OF EXPIRATION TIME OF EVENT-BASED ARTICLES

BACKGROUND

Field of the Invention

The invention relates generally to providing online media content and, more particularly, to providing online media content for a pre-planned event.

Description of the Related Art

Content aggregators obtain articles for various events and news happenings, from various content sources and present them in an organized and meaningful way for users. The events and news happenings (collectively termed "events") may be pre-planned or un-planned events. A pre-planned event is an event with a planned schedule time of occurrence, such as sporting events, scheduled meetings, movie releases, award ceremonies (Academy awards, Emmy, etc.), presidential debates, etc. An un-planned event is an event that is not scheduled and occurs spontaneously, such as natural disasters, medical or other emergency, shootings, etc.

With the growing number of content providers generating/providing increased number of articles for each event, it has become increasingly hard for the content aggregators to determine when to publish certain articles for an event and when to suppress certain articles from being published. The problem is exacerbated by the fact that not all content sources provide an expiration date/time for the articles beyond which the articles becomes "stale" or irrelevant. In fact, very few of the articles have clear expiration dates. As a result, the content aggregators are publishing articles for events that include articles that are stale or old making the articles less interesting to the users. Providing stale contents for a particular topic/event will result in users' decreased engagement leading to users dropping off the website.

It is in this context that the embodiments of the invention arise.

SUMMARY

Embodiments of the disclosure provide methods, system and computer readable programming logic for detecting expiration time of an article received for publication for a pre-planned event. The expiration time of the article is used for determining whether the article should be assigned to a content pool of article selected for publishing for an event. The article is analyzed to identify one or more article attributes. The article attributes are used to match the article to an event identifier for a pre-planned event. Once the event identifier of the pre-planned event is identified, the article attributes are examined to identify one or more event phase indicators that correlates to a specific phase of the pre-planned event. The expiration time of the article is computed based on the specific phase of the identified pre-planned event. The expiration time of the article is used to rank the article and for determining if the article needs to included or excluded from a content pool of articles that are selected for publishing for the pre-planned event.

The various embodiments, as will be described below, define ways to select articles for publishing for different phases of a pre-planned event by computing the expiration time of the articles so that users are presented with relevant and fresh set of articles that are appropriate for the specific phase of the event. Articles that are older may be removed from the content pool or ranked lower in accordance to degree of staleness. Similarly, articles that are new for the specific phase of the pre-planned event are accorded a higher ranking so that they can surface more and be presented at the top of the list of articles for the specific phase of the pre-planned event. As newer and fresher articles are received for the specific phase of the pre-planned event, these articles are ranked higher so that users are presented with updated content, which offer additional perspectives for the particular phase of the pre-planned event. Additional embodiments may include ranking the articles based not only on the expiration time but also based on reliability of content source that generated the article. It should be appreciated that the present embodiments can be implemented in numerous ways, such as a process, an apparatus, a system, a device, or a method on a computer readable medium. Several embodiments are described below.

In one embodiment, the present invention provides a method for detecting expiration time of an article. The method includes receiving the article for a pre-planned event. The article is analyzed to identify one or more article attributes. The article is then matched to an event identifier of the pre-planned event, using the article attributes. The event identifier is pre-defined for the pre-planned event and stored in an event database. The event identifier acts as an index to the event database for obtaining event characteristics of the pre-planned event. The article attributes are examined to identify event phase indicators that correlate to a specific event phase of the pre-planned event. An expiration time of the article is computed based on the specific event phase of the pre-planned event associated with the article. The computed expiration time is used to rank the article. The expiration time is also used for considering assigning the article to a content pool of articles selected for publishing for the specific event phase of the pre-planned event.

In another embodiment, a method for detecting expiration time of an article, is disclosed. The method includes receiving the article for a pre-planned event. The article is analyzed to identify one or more article attributes. The article is matched to an event identifier within an event database, using the one or more article attributes. The event database includes event identifiers that are pre-defined for a plurality of pre-planned events. The matching results in the identification of event characteristics of the pre-planned event. The article attributes are examined to identify event phase indicators. The event phase indicators are used to generate a vector of multiple dimensions for the article. The vector correlates to a specific event phase of the pre-planned event. The expiration time of the article is computed based on the specific event phase of the article defined in the vector. The computation results in the ranking of the article and in considering assigning the article to a content pool of articles that are selected for publishing for the specific event phase of the pre-planned event.

In yet another embodiment, a non-transitory computer-readable medium with program instructions for a method to detect expiration time of an article, is disclosed. The computer-readable medium includes program instructions for receiving the article for a pre-planned event; program instructions for analyzing the article to identify one or more article attributes; program instructions for matching the article to a pre-defined event identifier in an event database using the article attributes, the event identifier acting as an index to the event database for obtaining event characteristics of the pre-planned event; program instructions for examining the article attributes to identify event phase indicators that correlate to a specific event phase of the pre-planned event; and program instructions for computing expiration time of the article based on the specific event phase of the pre-planned event, wherein the expiration time is used to rank the article and for considering assigning of the article to a content pool of articles selected for publishing for the specific event phase of the pre-planned event.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Embodiments of the present invention provide system, computer readable media having program instructions, and methods for processing article content from content sources to identify a pre-planned event associated with the article and to detect expiration time of the article for the pre-planned event. The processing of the article includes analyzing the content of the article to determine temporal and/or textual attributes and use the article attributes to identify an event identifier of the pre-planned event from an event database. Event characteristics of a pre-planned event are obtained using the event identifier. The event characteristics and the article attributes are used to determine a specific event phase of the pre-planned event associated with the article. The event phase is used to compute the expiration time of the article. The expiration time acts as an important signal for ranking the article content, for identifying and removing obsolete content from a content pool of articles that are selected for publishing for the specific phase of the pre-planned event. The various embodiments provide an effective way of identifying and presenting current articles for each phase of the pre-planned event, thereby enriching a user's interaction experience leading to increased user engagement.

The pre-planned event is an event that is scheduled to occur at a pre-defined occurrence time. The pre-planned events discussed in the various embodiments may have occurrence times that are in the past, in the current or sometime in the future. The expiration time is used to rank the article, with the freshest or more recent articles being ranked higher and stale or older contents ranked lower. The article ranking is used in determining the relative position of the article within the content pool and for determining whether the article should be retained or removed from the content pool so that the articles presented for the users are more recent and relevant for the specific event phase of the pre-planned event.

With the aforementioned brief overview, subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combinations thereof (other than software per se). The following detailed description is, therefore, not intended to be taken in a limiting sense.

It should be noted that throughout the specification and claims, terms may have nuanced meanings suggested or implied in context beyond an explicitly stated meaning. Likewise, the phrase "in one embodiment" as used throughout does not necessarily refer to the same embodiment and the phrase "in another embodiment" as used herein does not necessarily refer to a different embodiment. It is intended, for example, that claimed subject matter include combinations of example embodiments in whole or in part.

Figure 1:
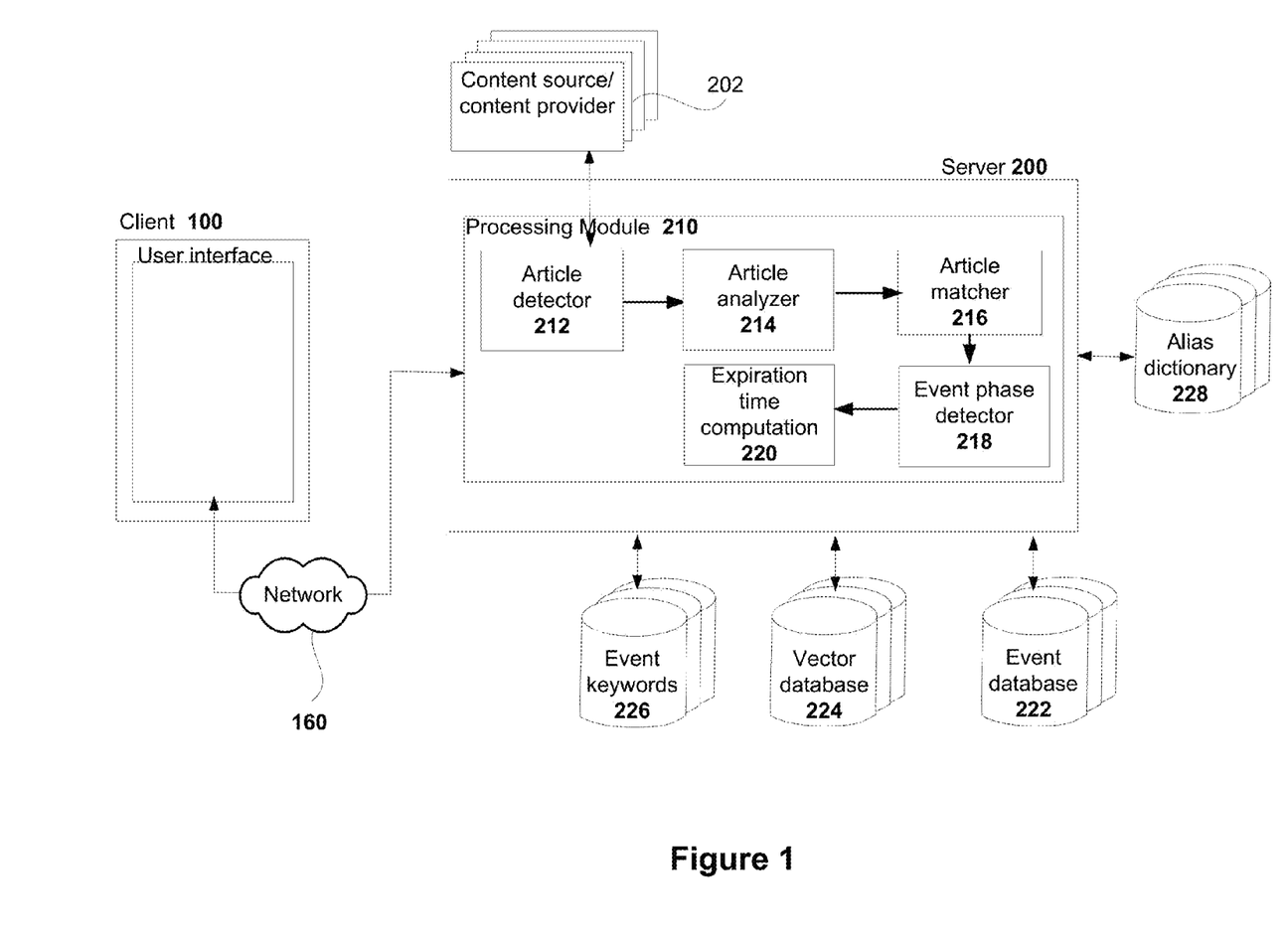
FIG. 1 illustrates a simple block diagram of various modules within a processing module that is used to detect expiration time of an article obtained from a content source, in accordance with an embodiment of the present invention.

Three distinct steps are followed to determine the expiration time of the article: identify the pre-planned event; detect the event phase of the identified pre-planned event; and determine the expiration time of the pre-planned event based on the detected event phase. FIG. 1 illustrates an exemplary system that is used for performing the aforementioned steps to determine the expiration time of the article. The system includes a server device 200 in which a processing module 210 with programming logic for processing article content from various content sources, executes. The server device may be part of a host system hosted by a content accumulator/aggregator that obtains the article for publishing. The server device 200 interacts with a client device 100 over a network 160, such as the Internet.

The client device 100 may include a computing device capable of sending or receiving signals, such as via wired or a wireless network. The client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

The server may be a computing device that may be capable of sending or receiving signals, such as via a wired or wireless network, or may be capable of processing or storing signals, such as in memory. The server may include one or more central processing units and memory. The server may also include one or more mass storage devices, one or more power supplies, one or more wired or wireless network interfaces, one or more input/output interfaces or one or more operating systems. The server may be a content server that includes configuration to provide content via a network to another device, such as the client device. The content server may, for example, host a variety of sites, such as a social networking site, business sites, education sites, dictionary sites, encyclopedia sites, financial sites, government sites, etc. The content servers may provide a variety of services that include, but are not limited to, web services, third-party services, audio services, video services, email services, instant messaging (IM) services, short message services (SMS), multimedia messaging services (MMS), file transfer protocol (FTP) services, voice over internet protocol (VOIP) services, calendaring services, photo services, or the like. Examples of content may include text, images, audio, video, or the like.

The network may couple devices so that communications may be exchanged, such as between a server and a client device or other types of devices, including between wireless devices coupled via a wireless network, for example. The network may include the internet, one or more local area networks (LANs), one or more wide area networks (WANs), wire-line type connections, wireless type connections, or any combination thereof.

The client device 100 includes a display device with a user interface that is configured to enable a user to access a webpage on which article content for different events are presented by the server 200. The events for which article contents are provided may include pre-planned events and/or un-planned events. The article content for the pre-planned and/or un-planned events provided by the server are rendered on the display device of the client device.

The processing module 210 executing on the server 200 includes a plurality of modules that are configured to receive/obtain the articles from one or more content sources for an event, process the article and compute an expiration time for the articles. Toward this end, the processing module 210 includes an article detector 212, article analyzer 214, article matcher 216, event phase detector 218 and an expiration time computation module 220. The article detector 212 detects an article for an event. The article may be provided by a content provider 202 for publishing for the event. In some embodiment, the article detector 212 may receive the article from a "crawler" module that identifies and retrieves article from one or more content sources 202. Upon detection, the article detector 212 provides the article to the article analyzer 214 for further processing.

The article analyzer 214 scans the article to determine if the article relates to an event and, if so, whether the event is a pre-planned event. In order to determine if the article belongs to a pre-planned event, the article analyzer 214 may scan the article to identify one or more article attributes. Some of the attributes that may be identified by the article analyzer 214 include article publishing date (if available), article source, article headline or topic line, and one or more keywords within the article content describing the article. Using the article attributes, the article analyzer 214 determines if the article is about an event. If the article is about an event, then the article analyzer 214 determines if the article relates to a pre-planned event or an un-planned event. The article analyzer 214 may rely on an events database 222 to determine if the article is for a pre-planned event. The events database 222 is a repository that stores event related information including schedules of a plurality of pre-planned events. The article analyzer 214 tries to match one or more article attributes with one or more event characteristics associated with a pre-planned event within the event database. The article attributes used for matching include one or more aliases of the one or more article attributes that are identified and maintained in an alias dictionary 228. If no match is found, then the article relates to an un-planned event. In such a case, the article analyzer 214 stops further processing of the article. On the other hand, if the article analyzer 214 finds a match for the one or more attributes within the event database, then the article is about a pre-planned event and the article analyzer 214 determines the event category. The article analyzer then forwards the event category, the article attributes and the article to the article matcher 216 to match the article to a specific pre-planned event under the event category.

Broadly speaking, the article matcher 216 receives the event category, article attributes and the article from the article analyzer 214 and interacts with the event database 222 for the event category to find a match of the article to the pre-planned event. In some embodiments, the system maintains a distinct event database 222 identifying all pre-planned events for each event category. The article matcher module 216 further analyzes the article attributes to identify one or more event characteristics contained therein. For example, the article attributes may include keywords that describe the article. These keywords may be matched with one or more event characteristics of a pre-planned event within the identified event category. In the above example, the keywords identified in the article attributes may include an event name, one or more subjects defined in the article (i.e., participants), location of the event, etc. The event characteristics are used to describe an event and may include event identifier, event start time, event end time, event duration, event description, event location, one or more event participants, event category, type of event, etc. The list of event characteristics is exemplary and should not be considered exhaustive or limiting. Fewer or additional characteristics may be used to describe the event.

The article matcher 216 examines the article attributes of the article, identifies one or more article attributes that match the event characteristics of the event. For example, during examination, the article matcher 216 may identify one or more attributes of the article that correlate to event participant characteristics defined for an event. In this example, the article matcher may detect aliases for the one or more attributes and use the aliases for matching to the event characteristics. The article matcher may refer to the alias dictionary 228 to identify the various aliases for the one or more article attributes. In the above example, if the event is a presidential debate, then the article attributes of the article may identify the presidential candidates that are participating in the debate, and use these attributes to match to the event participant characteristics defined for the pre-planned presidential debate event. Similarly, if the event is a basketball game within a division of the National Basketball Association (NBA), then the article attributes, such as keywords within the article, may identify the teams that are participating in the basketball game. In another example, the event may be a movie award show/ceremony, such as Golden Globes or Academy Awards, etc., and the article attributes may identify the award year, event host, etc., which can be matched with the corresponding event participant characteristics defined for the pre-planned award show/ceremony. Details of finding the match between the article attributes and event characteristics will be described in detail with reference to FIG. 2. Upon matching the article attributes to the event characteristics of a particular pre-planned event and identifying the specific pre-planned event to which the article belongs, the article matcher 216 obtains the event identification and other event characteristics of the identified pre-planned event.

The event characteristics and event identifier of the pre-planned event along with the article attributes of the article are then provided to the event phase detector module 218 for further analysis. The event phase detector module 218 uses the article attributes and the event characteristics of the pre-planned event to determine the specific phase of the event the article belongs. A pre-planned event may be broadly divided into a pre-phase, in-phase and post-phase. For example, for a presidential debate event, the phases may include pre-debate, during-debate and post-debate. Similarly, for an academy award event, the phases may include pre-award, during-award and post-award and for the basketball game, the phases may include pre-game, in-game and post-game. Additional phases may be defined for an event based on the granularity required. In some embodiments, the additional phases may be defined based on the number of articles received for the pre-planned event, popularity of the event, event duration, expected viewership, etc. Additional phases, in the basketball game or any other sporting event, may include first quarter, mid-game and third quarter within the in-game phase. Based on the granularity defined for the event, the phase detector module may determine the specific phase that the article is related to for the pre-planned event.

The event phase detector may generate a vector of multi-dimensions and match the generated vector to one of a plurality of pre-defined vectors or a machine learnt classification (provided by event classifier 216b) for the event category, maintained in a vector database 224. Each of the pre-defined vectors relates to a specific phase of the pre-planned event. The vector of the article is generated by matching keywords found within the article to the keywords defined in a event keywords database 226 for the event category. Once the phase is detected for the article, the expiration time computation module 220 will compute the expiration time of the article. The computation module 220 may refer to some pre-defined rules and the characteristics of the event to compute the expiration time. For example, according to the pre-defined rules, the computation module 220 may set the expiration time of an article associated with a pre-event phase to be equal to the start time of the pre-planned event defined by the corresponding event characteristic. Similarly, an article associated with a mid-event phase may have its expiration time set to event end time of the pre-planned event and the expiration time of an article associated with post-phase may be set to a start time of next pre-planned event having the same event participants. Thus, for an article associated with post-phase of presidential debate, the expiration time may be set to be equal to the start time of the next presidential debate; for a sporting game between two teams, the expiration time of a post-phase article may be set to the start time of a second game between the same two teams.

The expiration time is used by the processing module to provide a ranking for the article amongst a pool of articles that are selected for publishing for the specific phase of the pre-planned event. The computation module may rank the article higher based on the recency of the article compared to other articles in the content pool. The computation module may also taken into account other article attributes, such as reputation of the content source providing the article, etc., when ranking the article. The ranking is used to determine the relative position of the article within the content pool of articles selected for publishing for the pre-planned event and to determine whether the article needs to be removed from the content pool due to the staleness of the article.

Figure 2:
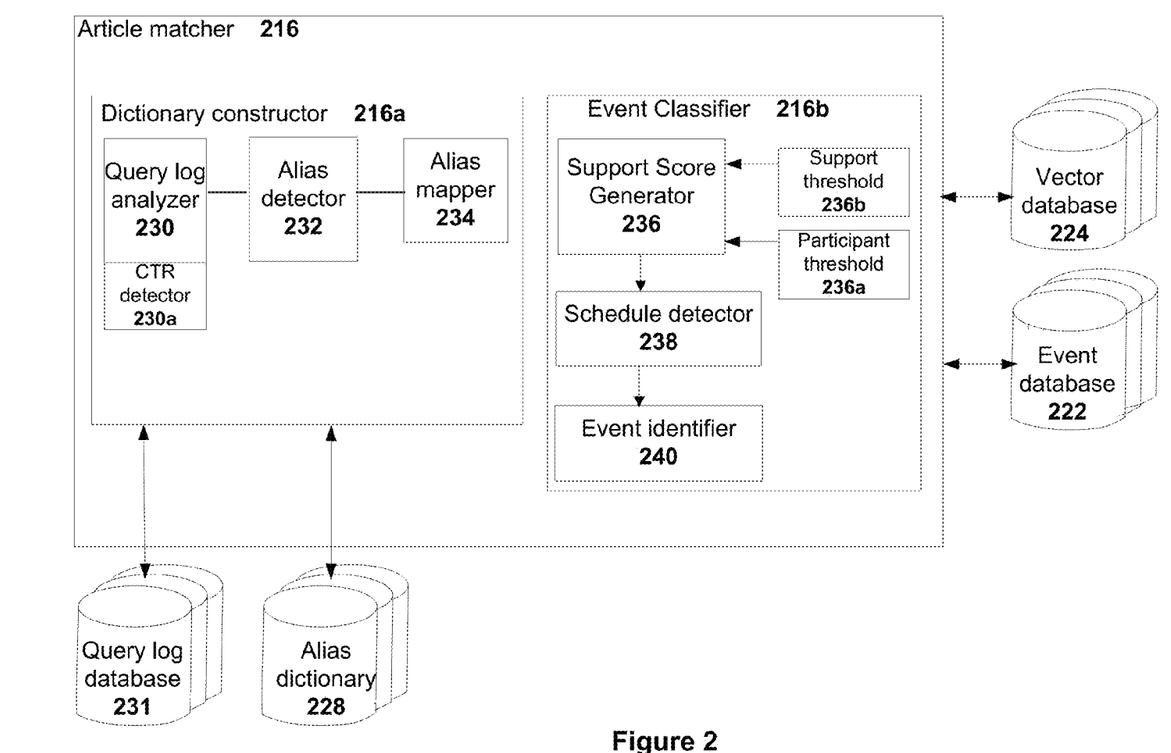
FIG. 2 illustrates a simple block diagram of various sub-modules within an article matcher module defined in the processing module, in accordance with an embodiment of the present invention.

FIG. 2 illustrates a simple block diagram of the various sub-modules within the article matcher module 216, used for matching the article to an event identifier in order to obtain event characteristics of the pre-planned event, in one embodiment. The article matcher module 216 includes a dictionary constructor 216a and an event classifier 216b. The dictionary constructor 216a, in turn, includes additional sub-modules, such as query log analyzer 230, an alias identifier 232 and an alias mapper module 234. The article matcher module 216 needs to identify different ways one or more event characteristics, such as event participants, etc., are referred by different users in order to map an article to a pre-planned event. Toward this end, the article matcher module first engages the dictionary constructor 216a to construct an alias dictionary for one or more event characteristics and then engage the event classifier 216b to match the article attributes to the corresponding event characteristics.

The dictionary constructor 216a examines query logs, such as search query logs, obtained from query log database 231 to determine various aliases by which an event participant, for example, can be referred. Although the role of the dictionary constructor has been described with reference to the event participant, it should be noted that the same process and modules may be used to determine aliases of one or more of the other event characteristics that may be used to identify the pre-planned event. To determine the various aliases, the dictionary constructor engages a query log analyzer 230 to track various queries that lead to a high click through rate (CTR) on an official/authoritative page for an event participant. For example, to determine all the aliases for a sports team, such as "San Francisco 49ers", the query log analyzer 230 within the dictionary constructor 216a determines all the search queries related to the 49ers sports team that have high CTR on the official page. A CTR detector 230a within the query log analyzer 230 is used to keep track of the CTRs for the different queries that lead to the official page for the event participant. The query log analyzer may perform the mining and analysis of a defined period's worth of query logs, such as query logs for the past 3 months, 6 months, 1 year, etc., in order to identify the various aliases for a pre-planned event characteristic. It should be noted that using the query logs for analysis is one way of determining the aliases and other ways of determining the aliases may also be employed in addition to the query log analysis. Upon performing the analysis of the query logs, the query log analyzer provides the analysis information to the alias detector module 232.

Based on the query log analysis, the alias detector module 232 may determine some of the commonly used queries for an event participant characteristic, such as San Francisco 49ers to be 49ers, san francisco 49ers, the 49ers, SF 49ers. These queries are considered by the alias detector 232 to be the aliases for the team "San Francisco 49ers". The alias detector module 232 finds such aliases for all the event participants. An alias mapper 234 within the dictionary constructor 216a constructs an alias dictionary for each event category and maps the aliases of the event characteristics, such as the event participants, to a unique characteristic identifier. For example, for a basketball game or a sports game, the event characteristic may be a participating team and the alias mapper will map the aliases for the team to a unique team identifier. Similarly, for a presidential debate, the event characteristic may be the event participants, such as presidential contenders, and the alias mapper will map the aliases for the presidential contenders to a unique participant identifier. The dictionary constructor 216a constructs such alias dictionary for each event category and stores the alias dictionary for each event category distinctly in an alias database 228. Information from the alias dictionary is retrieved from the alias database 228 and used by the event classifier 216b to identify the specific pre-planned event for associating with the article.

The event classifier 216b scans the article to identify the various article attributes. Some of the article attributes identified within the article may include keywords that identify one or more event characteristics, such as event participants. In some embodiments, the scanning of the article includes determining the event category for the article, identifying the appropriate alias dictionary for the event category and scanning the headline/topic line as well as scanning the body content of the article to identify the keywords that match the one or more event characteristics (for e.g., event participants) within the alias dictionary for the identified event category.

In the case where event participants are matched to the article attributes of the article, a support score generator 236 within the event classifier 216b is used to determine the support for each event participant within the article and generate a support score for the respective event participants identified in the article. A support for an event participant, as used in the various embodiments, is the number of times any alias of the event participant appears in the article (in the headline as well as the body of the article) and the support score generated keeps track of such appearances. After generating the support score for each event participant, the support score generator 236 determines if the event participants mentioned in the article meet a participant threshold defined for the event category. Each event category may have its own pre-defined threshold. For example, in the case of basketball game, the participant threshold may be 2, in the case of presidential primary, the participant threshold may depend on the number of candidates running for a party, in the case of golf, the participant threshold may depend on the number of qualified players, etc. Consequently, the support score generator may determine the participant threshold for the event category associated with the article, using the participant threshold module 236a. In one embodiment, the participant threshold may be based on the predetermined rules for the event category. For example, if the predefined rules require a minimum and a maximum number of event participants, then the threshold module 236a may identify both a minimum and a maximum participant threshold value. Alternately, if the predefined rules require the event participants to meet a certain number then the threshold module 236a may identify a single participant threshold value. For example, in order for an article to be related to a basket ball game, the number of event participants should be equal to two. Anything more or less may or may not qualify the article as related to a game.

If the number of event participants identified in the article exceeds the participant threshold value defined for the pre-planned event, the support score generator 236 performs further analysis to determine if each of the event participants identified in the article is below or above a support threshold value. The support score generator determines the support threshold value for each event category using the support threshold module 236b. The support threshold value may be pre-defined and may depend on the type of pre-planned event. If the event participants identified in the article meets the participant threshold, then the support count of each event participant is determined. If the support count for each event participant is below the support threshold value, then the article may not be about the pre-planned event. On the other hand, if the number of event participants is greater than the participant threshold defined for the event category associated with the pre-planned event and the support score for one or more of the participants is below the support threshold value, then the article may be related to the pre-planned event related to the event participants. For example, the article may be related to a basketball game and the article may refer to three teams (i.e., event participants). The support score for each team in the article is determined and it may be found that the support score for team1 is 12, support score for team 2 is 10 and support score for team 3 is 2. In this example, the support score generator module 236 may identify the teams (teams 1 and 2) that have the highest support score in the article to be the teams that need to be used for finding the match for the pre-planned event. In the above example, the support score is greater than the support threshold. It should be noted that the support score computed for each event participant includes the support count of aliases for the respective event participants.

Once the event participants are determined from the article, the event classifier 216b will use the schedule detector module 238 to identify a scheduled pre-planned event with the event participants. The schedule detector module 238 interacts with an event database 222 to identify schedule information for the pre-planned event that includes the identified event participants. The event database 222 maintains schedule information of all pre-planned events for each event category. The schedule information for the pre-planned event is provided to an event identifier module 240. The event identifier module 240 identifies the event identifier of the pre-planned event that includes the event participants referred in the article. In one embodiment, the schedule detector module may detect more than one pre-planned event that includes the event participants and query the event database to identify the schedule information for the detected pre-planned events. The schedule information of the detected pre-planned events is provided to the event identifier module 240. The event identifier module 240, in this embodiment, will identify the event whose schedule information matches or is closest to the article publish time, if available, or whose event characteristics match the one or more of the other article attributes. The identified event identifier is associated with the article.

Figure 3:
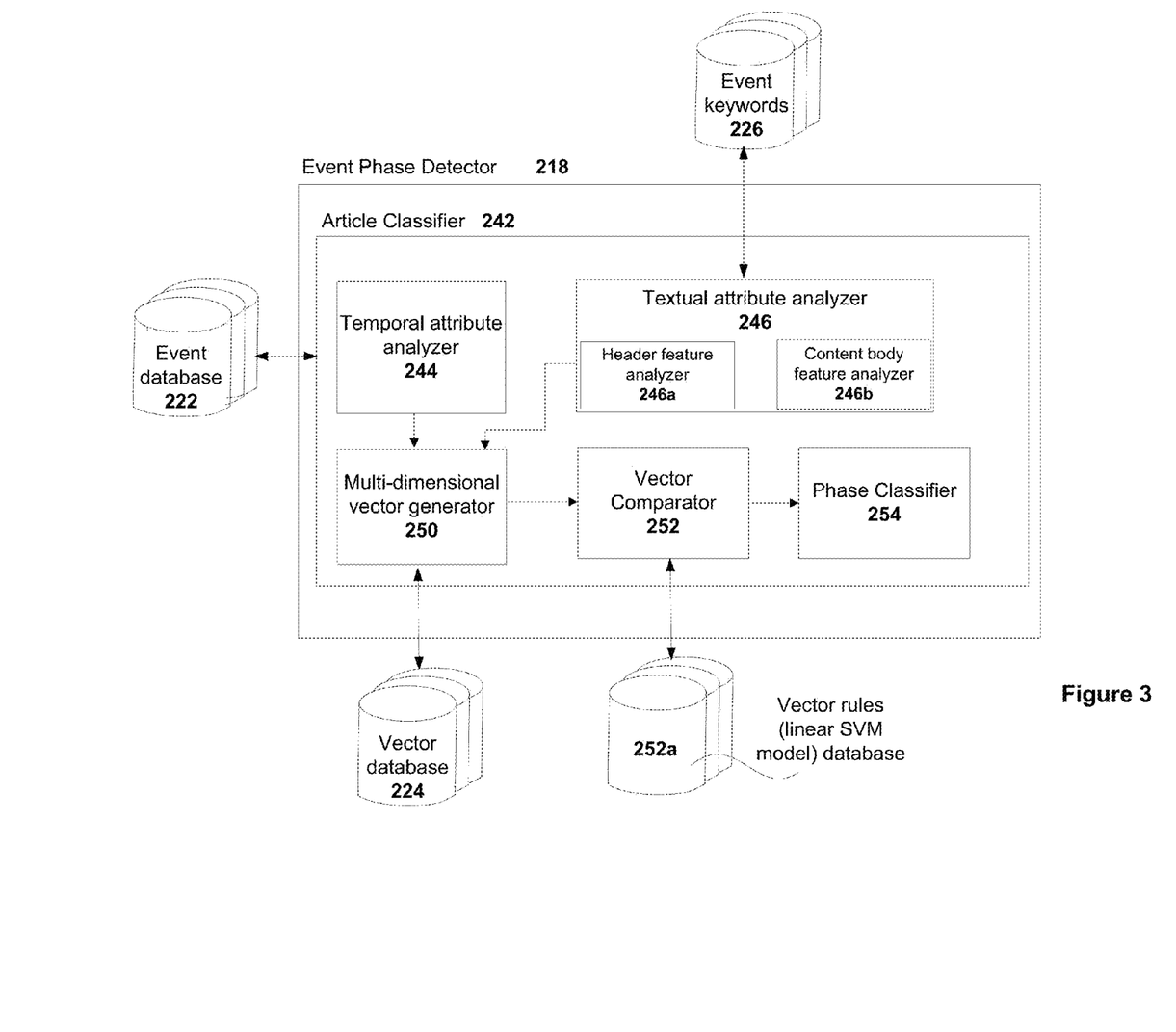
FIG. 3 illustrates a simple block diagram identifies various sub-modules within the event phase detector, in accordance with an embodiment of the present invention.

Once the article is associated with a particular event identifier, the article needs to be matched to a particular phase of the pre-planned event associated with the event identifier. FIG. 3 illustrates simplified block diagram of various sub-modules within the event phase detector module 218 of FIG. 1 that are used to identify a specific phase of the identified pre-planned event to associate with the article. An article classifier 242 is engaged to analyze the various article attributes and to classify the article to a specific phase of the pre-planned event. The article classifier 242 includes a plurality of sub-modules, such as temporal attribute analyzer 244, a textual attribute analyzer 246, a vector generator module 250, a vector comparator 252, a phase classifier 254, to detect the various article attributes and to classify the article to a specific phase of the pre-planned event.

The temporal attribute analyzer 244 is used to analyze the article attributes to identify the article publish time, compare the publish time with temporal event characteristics, such as event start time, event end time, etc., to populate different time-based features. The article publish time, when available, is identified as one of the article attributes that is defined for the article by a publisher or content source provider. In some embodiments, when the article publish time is not explicitly defined, the article publish time may be defined as the receipt time when the system receives the article from a content source/provider. The time-based features correlate with the event phases defined for the event category associated with the article. For example, if the event category defines three different phases (pre-phase, in-phase, and post-phase) for the events, then the temporal attribute analyzer may analyze the article publish time and populate three time-based features that correlate with the three identified phases. If the event category identifies five different phases (pre, first quarter, second quarter, third quarter and post-phase), then the temporal attribute analyzer may populate the five different time-based features correlating with those phases. In the example where there are five different phases defined for an event category, the five different time-based features may be set as follows:

Setting feature-1 to 1 when publish time<eventStartTime, with the remaining features being set to zero.

Setting feature 2 to 1 when eventStartTime<=publish time<eventEndTime/2, with the remaining features being set to zero Setting feature 3 to 1 when eventEndTime/2<=publish time<3*eventEndTime/4, with the remaining features being set to zero Setting feature 4 to 1 when 3*eventEndTime/4<=publish time<eventEndTime, with the remaining features being set to zero Setting feature 5 is set to 1 when publish time>eventEndTime, with the remaining features being set to zero.

Although it is shown, in the above example, that the temporal attribute analyzer 244 populates the various time-based features based on the article publish time, the temporal attribute analyzer 244 may populate the various time-based features using the article receipt time when the article publish time is not available.

A textual attribute analyzer 246 may parse the textual portion of the article to populate certain text based features. To accomplish the task of populating the text based features, the textual attribute analyzer 246 determines if certain keywords are present in the article. These keywords are pre-selected for the event category as they provide a strong signal or indication of the specific phase of the pre-defined event. The number of such pre-selected keywords may vary based on the event category. The pre-selected keywords for each event category may be stored distinctly in a keyword database 226. The textual attribute analyzer 246 interacts with the keyword database 226 to determine the keywords identified for the event category associated with the article. A headline feature analyzer 246a within the textual attribute analyzer 246 is engaged to parse the headline (i.e., topic line or title line) of the article to determine the presence of each of the keywords and populate the corresponding keyword feature for the headline with a 1 or zero based on the presence or absence of the keywords in the headline. Similarly, a content body feature analyzer module 246b within the textual attribute analyzer 246 is engaged to parse the body of the article to determine the presence of the same keywords within the body of the article and populates the corresponding keyword features for the body. In some embodiments, the presence of the keywords in the headline of the article is more conclusive for determining the phase of the pre-planned event than the presence of the same keywords within the body of the article. Along similar lines, the time based features are more conclusive than the text based features for determining the phase of the pre-planned event. As a result, the time based features may be first used to determine the specific phase of the article and the text based features may be used to either reinforce or refine the determined phase of the article.

Once the text based features are populated for the article, a vector generator module 250 uses the text based features and the time based features to generate a multi-dimensional vector for the article, wherein the number of dimensions is equal to the number of text based and time based features defined for the event category and, as explained above, the number of time based features depend on the number of phases defined for the event category and the number of text based features depend on the number of keywords defined for the event category. Once the multi-dimensional vector is generated, a vector comparator 252 is used to compare the generated vector associated with the article against a set of rule-based vectors that have been pre-defined for different phases of the event and the specific phase of the article is determined, based on the comparison. The set of rule-based vectors are generated by a classifier algorithm (not shown), using a set of test articles related to an event category. Each of the generated multi-dimensional rule-based vector is associated with a specific phase of the event, with more than one multi-dimensional vector being associated with a specific phase. The generated set of rule-based vectors is used to derive a linear model, which is stored in a vector rules database 252a. The linear model is used for classifying the vector generated for the article into appropriate phase of the pre-planned event. The classifier used to generate the linear model of vector (also termed Linear Support Vector Machines) is well known and is, hence, not discussed in detail herein. The vector comparator compares the generated vector for the article with the predefined rule-based vectors defined in the linear model that is maintained in the vector rules database 252a to find a match of the vector. A phase classifier 254 uses the matched rule-based vector to determine the exact phase of the article.

Once the exact phase of the article is determined, the expiration time of the article is easily computed. In some embodiments, the expiration time is computed based on predefined rules. For example, the predefined rules may state that if the article is related to the pre-phase of the event, the expiration time is set to start time of the event. Similarly, if the article is related to the mid-phase of the event, the expiration time is set to end time of the event, and if the article is related to the post-phase of the event, the expiration time is set to the start time of next event that includes the same event participants. The predefined rules may be based on the granularity in the phases desired for the pre-planned event and the expiration time computed according to the event phase granularity.

In some embodiments, the event characteristics of the pre-planned event obtained from the event database may be used to enrich a user's experience. In such embodiments, the information related to the pre-planned event provided in the event characteristics are used to identify additional articles related to the event participants, for example. The additional articles may be presented alongside the article in a topic page, for example, in one embodiment. In one embodiment, the additional articles may be presented as links alongside the article. For example, if the pre-planned event is a basketball game and the event characteristics identifies the teams in the game, then the team details are used to identify additional articles related to all games played between the two participating teams and presents the additional articles alongside the article. When the user accesses the article for reading, the user may be presented with the identified additional articles thereby enriching the user's online experience.

The various embodiments describe ways to process article content from different content sources for a pre-planned event to determine an expiration time for the article. The expiration time is used to determine if the article needs to be included in the content pool of articles and to rank the article within the content pool of articles selected for presenting for a particular phase of the pre-planned event. The ranking identifies the relative position of the article within the content pool. The various embodiments define ways of identifying and presenting fresh and recent content for the pre-planned event, providing the users with up-to-date articles thereby increasing users engagement for the pre-planned event at the content aggregator's website.

Figure 4:
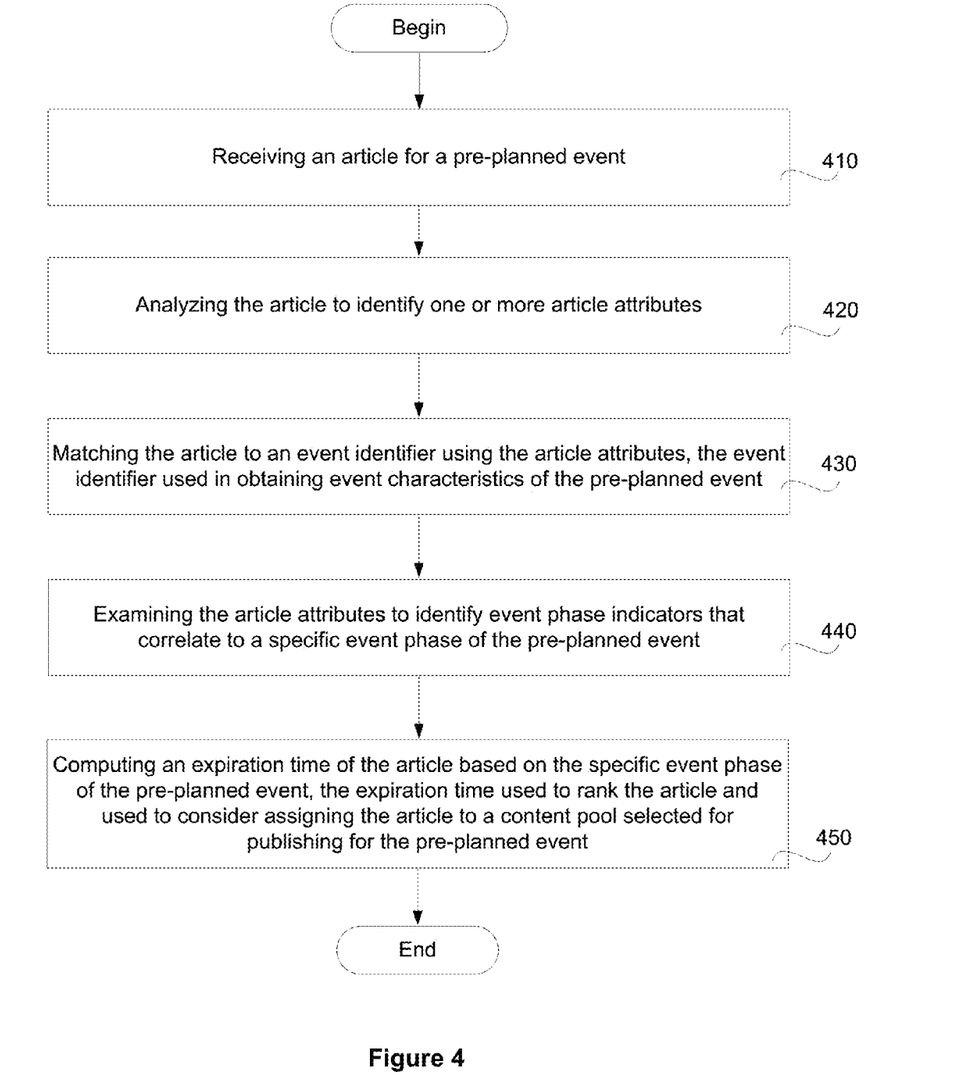
FIG. 4 illustrates a flow chart identifying method operations followed for detecting expiration time of an article, in accordance with an embodiment of the invention.

FIG. 4 illustrates method operations for detecting expiration time of an article, in accordance to one embodiment of the invention. The method begins at operation 410 with the receipt of an article for publishing. The article may be provided by a content provider (i.e., "pushed") or may be obtained from a content source (i.e., "pulled") using a "crawling" or similar mechanism. The received article is analyzed to determine the article attributes, as illustrated in operation 420. The article attributes that may be identified, based on the analysis, may include article source, article publish time (if available), article headline, one or more keywords related to an event associated with the article.

The article is matched to an event identifier using the identified article attributes, as illustrated in operation 430. The event identifier is pre-defined for different pre-planned events in each event category and stored in an event database. The event identifier acts as an index into the event database for identifying and obtaining event characteristics of the pre-planned event. The event characteristics define the pre-planned event and may include, in addition to the event identifier, event start time, event end time, event duration, event description, event location, one or more event participants, event category, type of event, and combinations thereof. The event identifier is identified by matching article attributes including one or more aliases to one or more event characteristics, such as event participants.

After identifying the pre-planned event, specific phase of the pre-planned event for associating the article, is identified. In order to determine the specific phase, the attributes of the article are examined to identify keywords that provide strong indications of specific event phases of a pre-planned event, as illustrated in operation 440. A set of keywords are pre-identified for each event category and maintained in an keyword database and the keywords for the event category are used to determine a specific phase of the pre-planned event.

Once the event phase is detected for the article, the expiration time for the article is computed based on the phase of the pre-planned event the article belongs and pre-defined rules, as illustrated in operation 450. The expiration time is used to determine if the article has to be included in a content pool of articles that are selected for publishing for the specific phase of the pre-planned event or removed from the content pool and also for defining the relative ranking of the article within the content pool.

Figure 5:
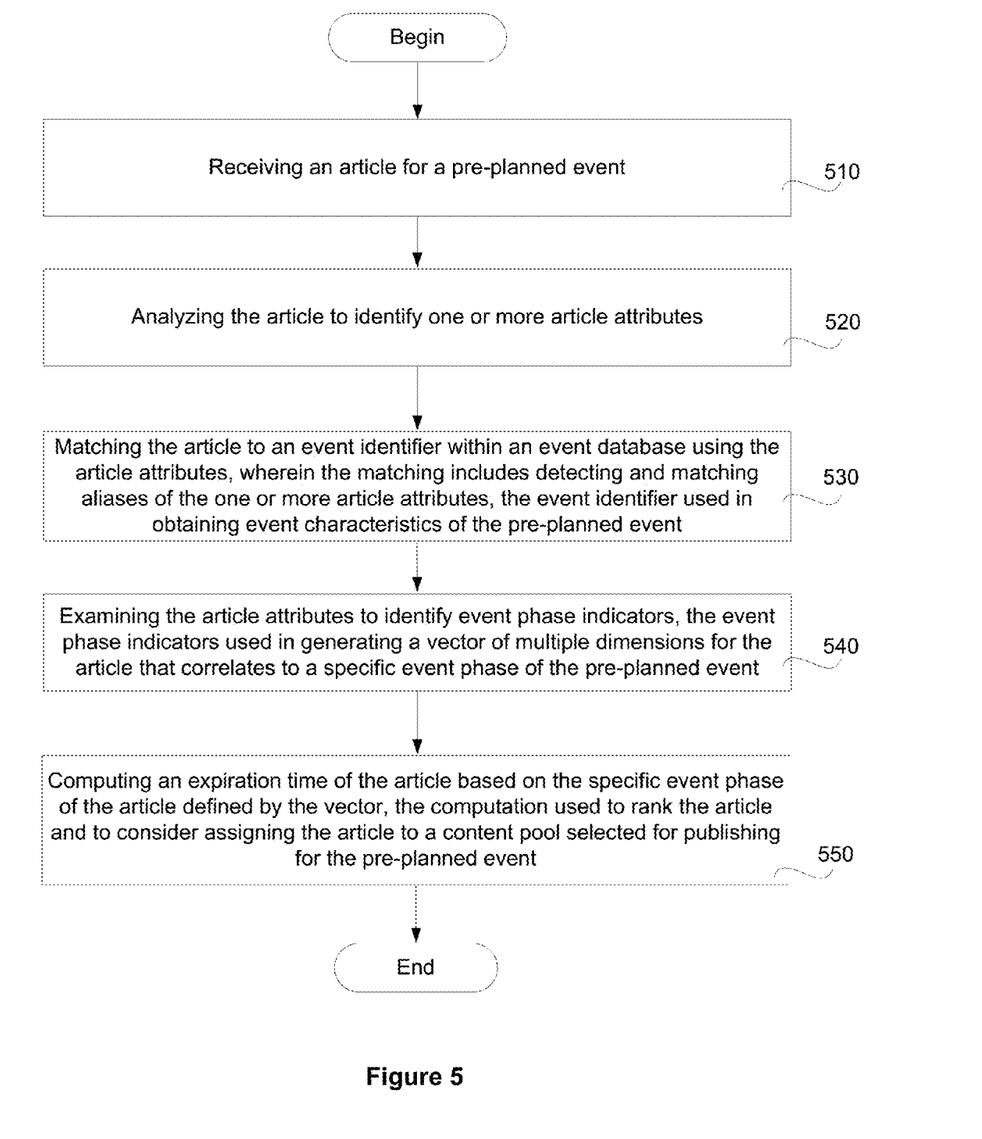
FIG. 5 illustrates exemplary method operations followed for detecting expiration time of an article, in accordance with an alternate embodiment of the invention.

FIG. 5 illustrates the method operation for detecting expiration time of an article, in an alternate embodiment of the invention. The method begins at operation 510 with the receiving of the article for a pre-planned event. The article may be provided by a content provider or retrieved from a content source. The article is analyzed to identify the article attributes, as illustrated in operation 520. The article attributes define the article and include such information as the article source, article publish time, article headline, certain keywords that define the type of event, participants that are involved in the event, one or more aliases of the one or more attributes, etc.

The article is matched to an event identifier using the article attributes, as illustrated in operation 530. The article attributes that are used for finding a match with the event characteristics defined for a pre-planned event include the aliases identified for the one or more attributes. The event identifier acts as an index to the event database for obtaining the event characteristics.

The article attributes are examined to identify event phase indicators defined therein, as illustrated in operation 540. In order to determine the event phase indicators, the article is scanned to detect presence of one or more keywords that provide a strong signal for determining an event phase. The keywords for determining the event phase may be pre-defined for each event category. The scanning of the article includes scanning the headline portion and the content body portion of the article to detect presence of these keywords. Presence of each keyword results in the definition of a corresponding text-based feature. Similarly, the article publish time may be examined to define one or more time-based features. The time-based features and the text-based features are used in the generation of a multi-dimensional vector for the article, wherein each dimension of the vector is associated with either a time-based feature or a text-based feature. The vector generated for the article is then matched to a pre-defined vector defined for a specific phase of the pre-planned event. A set of vectors are pre-defined using a set of test articles, with each vector within the set being associated with a specific phase. More than one pre-defined vector may be associated with a specific phase of a pre-planned event. The phase of the pre-planned event defined in the article is determined, based on which pre-defined vector the generated article vector matches.

Upon detecting the phase of the article, expiration time of the article is computed, as illustrated in operation 550. The expiration time of the article is used to rank the article and for considering assigning the article to a content pool of articles selected for publishing under the specific phase of the pre-planned event.

With the ever increasing corpus size of articles that are available for various pre-planned events, the various embodiments describe an efficient method for determining expiration time of articles so that users can be presented with fresh content. The ranking further organizes the articles within a content pool selected for publishing so that users are provided with only relevant articles for a pre-planned event.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system is depicted in FIGS. 6A-6C.

Figure 6A:
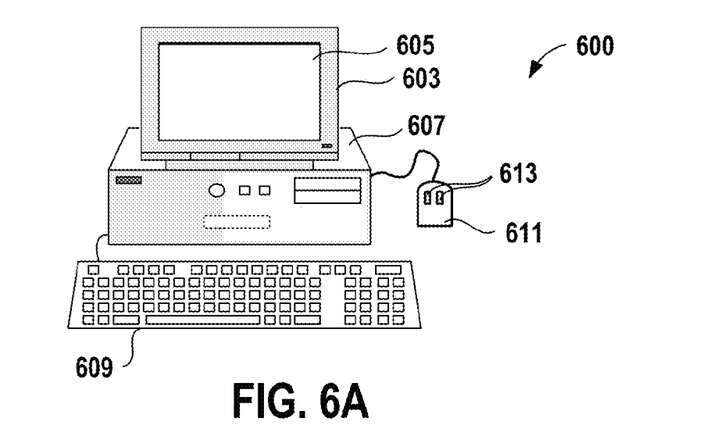
FIG. 6A is a generalized diagram of a typical computer system suitable for use with the present invention.

In FIG. 6A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown. Other user input devices such as a trackball, touchscreen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 6B:
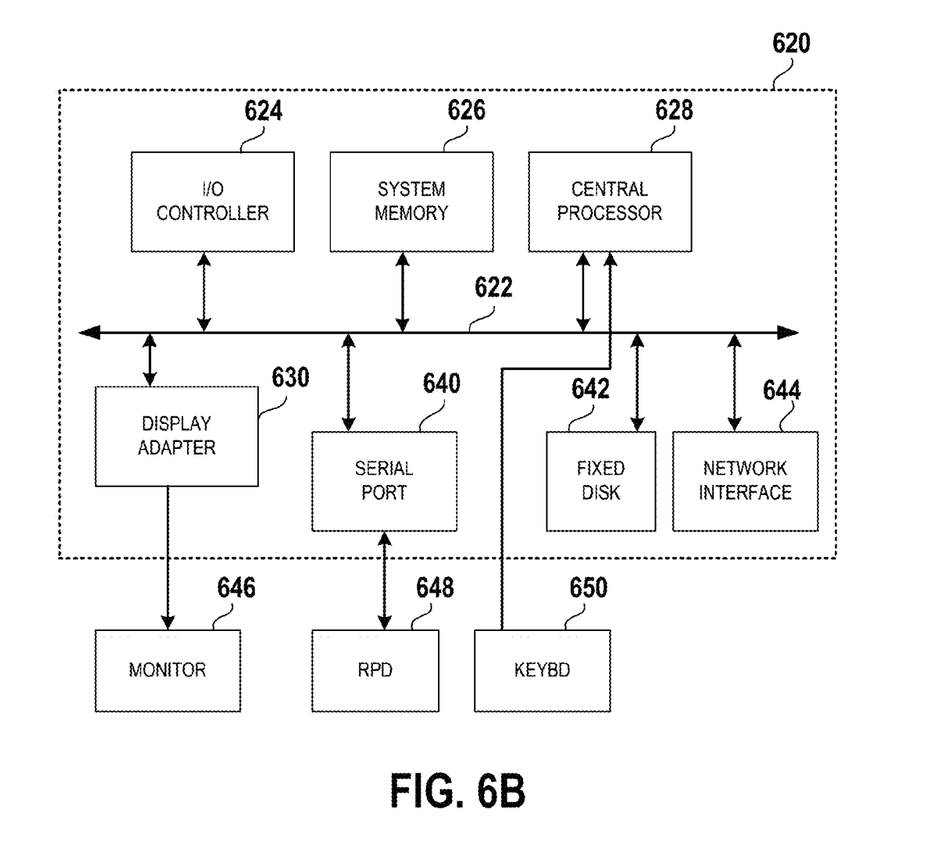
FIG. 6B shows subsystems in the typical computer system of FIG. 6A.
Figure 6C:
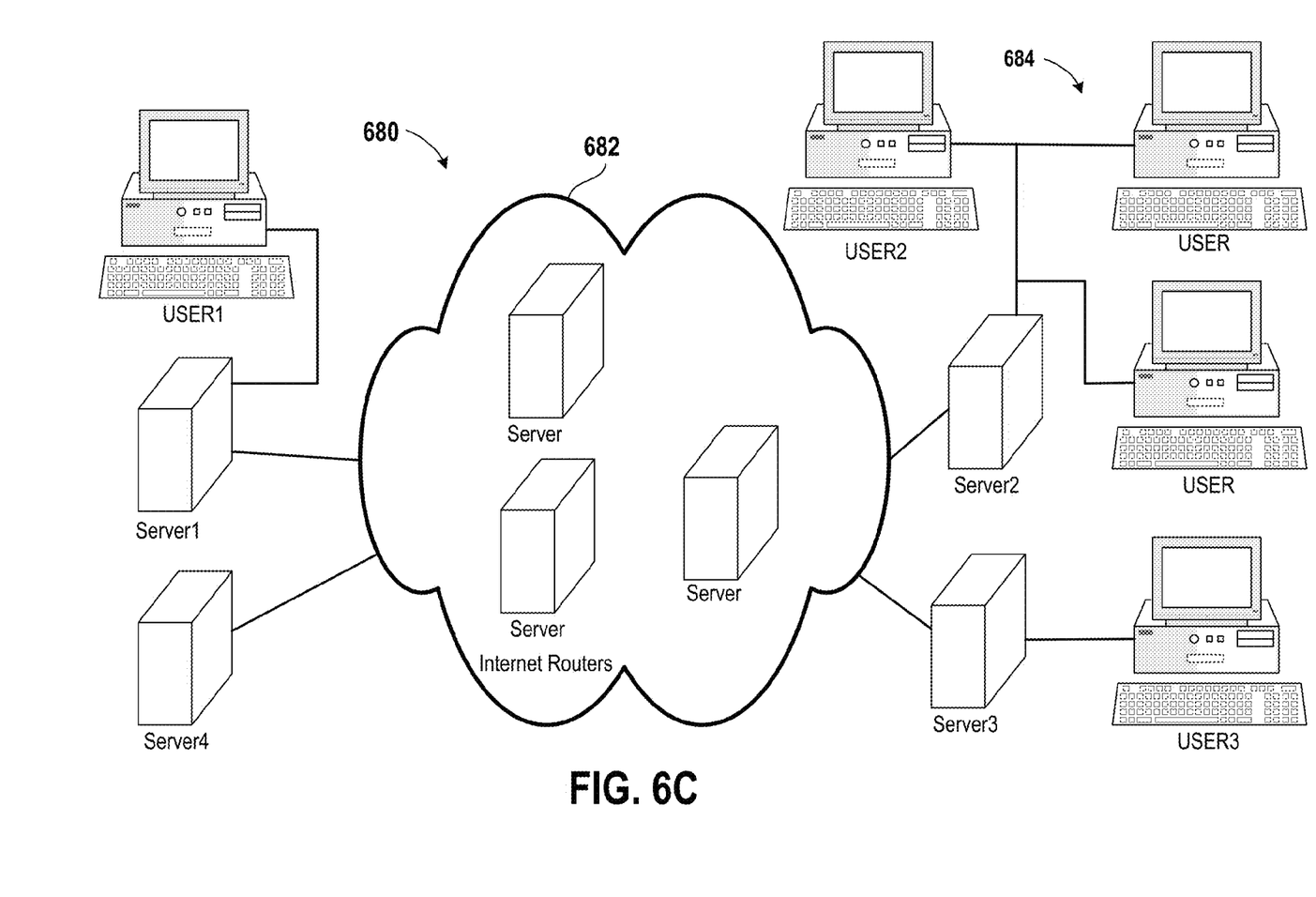
FIG. 6C is a generalized diagram of a typical network suitable for use with the present invention.

FIG. 6B illustrates an exemplary subsystems that might typically be found in a computer such as computer 600. In FIG. 6B, subsystems within box 620 are directly interfaced to internal bus 622. Such subsystems typically are contained within the computer system such as within cabinet 607 of FIG. 6A. Subsystems include input/output (I/O) controller 624, System Random Access Memory (RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 6A, many subsystem configurations are possible. FIG. 6B is illustrative of but one suitable configuration. Subsystems, components or devices other than those shown in FIG. 6B can be added. A suitable computer system can be achieved without using all of the subsystems shown in FIG. 6B. For example, a standalone computer need not be coupled to a network so Network Interface 644 would not be required. Other subsystems such as a CDROM drive, graphics accelerator, etc. can be included in the configuration without affecting the performance of the system of the present invention.

FIG. 6C is a generalized diagram of a typical network. In FIG. 6C, the network system 680 includes several local networks coupled to the Internet. Although specific network protocols, physical layers, topologies, and other network properties are presented herein, embodiments of the present invention are suitable for use with any network.

In FIG. 6C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of server routers 682. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 684 are shown utilizing a local network at a different location from USER1 computer. The computers at 684 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for detecting expiration time of an article, comprising:

receiving the article for a pre-planned event that is to provide online media content for real-time user consumption;

analyzing the article to identify one or more article attributes;

matching the article to an event identifier of the pre-planned event using the one or more article attributes, the event identifier being pre-defined for the pre-planned event and stored in an event database, the event identifier acting as an index to the event database for obtaining event characteristics of the pre-planned event, wherein the pre-planned event includes a plurality of event phases with each event phase of the plurality of event phases covering a specific period of the pre-planned event;

examining the one or more article attributes to identify an event phase indicator, the event phase indicator used in generating a vector having multiple dimensions for the article, the generated vector compared with pre-defined rule-based vectors defined for the article to identify the vector that correlates to a specific event phase of the pre-planned event, based on the event characteristics of the pre-planned event, wherein the event phase indicator is temporal-based and is used to associate the article to the specific event phase; and computing the expiration time of the article based on the specific event phase of the pre-planned event associated with the article, the computing performed using one or more pre-defined rules and the event characteristics of the pre-planned event, wherein the expiration time is used to rank the article and for consideration of assigning the article to a content pool of articles selectable for publishing for the specific event phase of the pre-planned event.

2. The method of claim 1, wherein the expiration time identifies a freshness factor used for determining relevancy of the article for the specific event phase of the pre-planned event.

3. The method of claim 1, wherein the pre-planned event is an event that is scheduled to occur at a pre-defined occurrence time, wherein the occurrence time is one of a past, current or future time.

4. The method of claim 1, wherein the article attributes include article publish time, article source, article headline, and one or more keywords defining the pre-planned event.

5. The method of claim 1, wherein the event characteristics include event identifier, event start time, event end time, event duration, event description, event location, one or more event participants, event category, type of event, or any combinations thereof.

6. The method of claim 1, wherein analyzing includes determining publish time of the article.

7. The method of claim 1, analyzing includes scanning the article for keywords, wherein the keywords identify one or more event characteristics of the pre-planned event, the event characteristics identified by the keywords used in developing the vector of multiple dimensions for the article.

8. The method of claim 7, wherein the scanning includes scanning textual portion of a headline of the article for the keywords, the scanning of the headline identifying one or more dimensions of the vector.

9. The method of claim 7, wherein the scanning includes scanning textual content of the article for the keywords, the scanning of the textual content identifying one or more dimensions of the vector.

10. The method of claim 7, wherein the keywords are pre-defined based on an event category associated with the pre-planned event.

11. The method of claim 7, wherein the scanning results in computing a support score for each of the one or more event characteristics identified by the keywords in the article, wherein the support score represents a frequency of appearance of the keywords identifying the respective event characteristics within the article,
wherein the event characteristics used for generating the support score are event participants.

12. The method of claim 11, wherein the scanning for keywords in the article includes scanning for one or more aliases defined for the one or more event characteristics, the aliases of the one or more event characteristics maintained in an alias dictionary, the scanning of the aliases resulting in adjustment of the support score for the respective event characteristics.

13. The method of claim 11, wherein the matching includes comparing a number of event participants against a pre-defined minimum character threshold value and a pre-defined maximum character threshold value and identifying the event identifier for the pre-planned event from the event database by matching the event participants, when the number of event participants is between the minimum and maximum character threshold values.

14. The method of claim 11, wherein the matching includes,
comparing the support scores of each of the event participants against a pre-defined support threshold value; and
identifying the event identifier of the pre-planned event from the events database for the event participants when the support score for the event participants meets or exceeds the pre-defined support threshold value.

15. The method of claim 1, when more than one event identifier matches to the attributes of the article, selecting the event identifier for the pre-planned event having one or more event characteristics that closely match the one or more of the attributes of the article, wherein the selecting includes identifying the pre-planned event that is yet to occur or the pre-planned event that has already occurred.

16. The method of claim 1, further includes removing the article from the content pool for the pre-planned event, upon expiration of the article.

17. The method of claim 1, further includes, adjusting a ranking of the article to be lower than other articles within the content pool for the pre-planned event, upon expiration of the article.

18. A method for detecting expiration time of an article, comprising:
receiving the article for a pre-planned event that is to provide online media content for real-time user consumption;
analyzing the article to identify one or more article attributes;
matching the article to an event identifier of the pre-planned event within an event database using the one or more article attributes, the event database including event identifiers that are pre-defined for a plurality of pre-planned events, the matching resulting in identification of event characteristics of the pre-planned event, wherein the pre-planned event includes a plurality of event phases with each event phase of the plurality of event phases covering a specific period of the pre-planned event;
examining the article attributes to identify an event phase indicator, the event phase indicator used in generating a vector having multiple dimensions for the article, the generated vector compared with pre-defined rule-based vectors defined for the article to identify the vector that correlates to a specific event phase of the pre-planned event, wherein the event phase indicator is temporal-based and is used to associate the article to the specific event phase; and
computing the expiration time of the article based on the specific event phase of the article defined by the vector, the computing performed using pre-defined rules and the event characteristics of the pre-planned event, the computation resulting in the ranking of the article and in considering assignment of the article to a content pool of articles selectable for publishing for the specific event phase of the pre-planned event.

19. The method of claim 18, wherein the event phase indicators are keywords that are used for identifying the event phase.

20. The method of claim 18, wherein the rule-based vectors are defined for an event category associated with the pre-planned event.

21. The method of claim 18, identifying additional articles by matching the event characteristics of the pre-planned event, the additional articles being presented to a user alongside the article for the pre-planned event or for a specific event phase of the pre-planned event.

22. A non-transitory computer readable medium having program instructions, which when executed by a processor, performs a method for detecting expiration time of an article, the computer readable medium comprising:
program instructions for receiving the article for a pre-planned event that is to provide online media content for real-time user consumption;
program instructions for analyzing the article to identify one or more article attributes;
program instructions for matching the article to an event identifier of the pre-planned event using the one or more article attributes, the event identifier being pre-defined for the pre-planned event and stored in an event database, the event identifier acting as an index to the event database for obtaining event characteristics of the pre-planned event, wherein the pre-planned event includes a plurality of event phases with each event phase of the plurality of event phases covering a specific period of the pre-planned event;
program instructions for examining the one or more article attributes to identify an event phase indicator, the event phase indicator used in generating a vector having multiple dimensions for the article, the vector generated for the article compared with pre-defined rule-based vectors defined for the article to identify the vector that correlates to a specific event phase of the pre-planned event, based on the event characteristics of the pre-planned event, wherein the event phase indicator is temporal-based and is used to associate the article to the specific event phase; and program instructions for computing the expiration time of the article based on the specific event phase of the pre-planned event associated with the article, the computing performed using one or more pre-defined rules and the event characteristics of the pre-planned event, wherein the expiration time is used to rank the article and for considering assigning of the article to a content pool of articles selectable for publishing for the specific event phase of the pre-planned event.

* * * * *